No. 687,837. Patented Dec. 3, 1901.
W. N. KEEN.
NUT LOCK.
(Application filed Apr. 25, 1901.)
(No Model.)

Witnesses:

Inventor
William N. Keen
By James Shuhy
Attorney

UNITED STATES PATENT OFFICE.

WILLIAM NICHOLSON KEEN, OF ABITA SPRINGS, LOUISIANA.

NUT-LOCK.

SPECIFICATION forming part of Letters Patent No. 687,837, dated December 3, 1901.

Application filed April 25, 1901. Serial No. 57,471. (No model.)

*To all whom it may concern:*

Be it known that I, WILLIAM NICHOLSON KEEN, a citizen of the United States, residing at Abita Springs, in the parish of Tammany and State of Louisiana, have invented new and useful Improvements in Nut-Locks, of which the following is a specification.

My invention relates to improvements in that class of nut-locking washers which in addition to securely holding nuts against casual rotation on bolts are calculated to yieldingly bear against the surfaces between which and the nuts they are interposed, and thereby take up expansion of the bolts in warm weather and also take up for wear of the bolts and maintain the same perfectly tight at all times.

It consists in a washer of the class described which while highly efficient in taking up expansion of the bolt and preferably casual turning of the nut to which it is applied is very easy of production, and consequently inexpensive, and is at the same time strong and durable.

The invention will be fully understood from the following description and claim when taken in connection with the accompanying drawings, in which—

Figure 1:
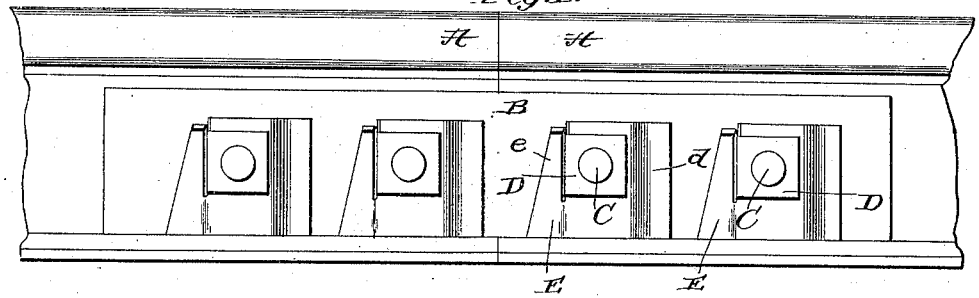
Figure 2:
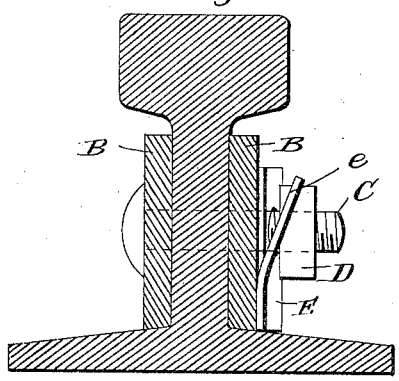
Figure 3:
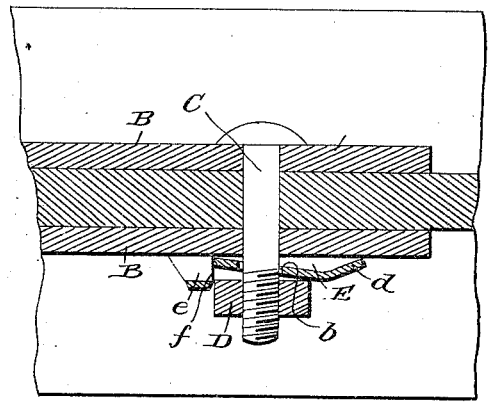
Figure 4:
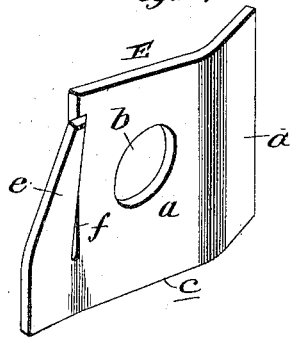

Figure 1 is a view illustrating a plurality of my improved washers as applied in a railway-rail joint. Figs. 2 and 3 are sections taken in the planes indicated by the broken lines 2 2 and 3 3, respectively, of Fig. 1. Fig. 4 is a perspective view of one of the washers removed.

In the said drawings similar letters of reference designate corresponding parts in all of the several views, referring to which—

A A are the meeting ends of two railway-rails, B B fish-plates thereon, C C bolts, and D D nuts on the bolts, all of which may be of the ordinary well-known construction.

E E are my improved washers, one of which is arranged on and used in conjunction with each bolt to take up expansion of the same in warm weather, and also to take up or compensate for wear of the bolt, and is also used in conjunction with each nut to hold the latter against casual loosening or rotation. The washers are each formed of one piece of suitable sheet metal and comprise a main portion *a*, provided with an opening *b* and by preference with a square lower edge *c*, a wing *d*, which is inclined inwardly from one end of the main portion and extends throughout the height thereof, and a tongue *e*, which extends outwardly from the main portion at the edge opposite to the wing *d* and is separated from said main portion by a vertical slit *f*, as illustrated. With the exception of its portion joined to the tongue *e*, which portion is curved outwardly, the main part *a* of the washer is flat. Consequently the portion of the washer joined to the tongue *e* and the edge formed by the slit *f* will bear throughout the height of the washer against the fish-plate.

In applying my improved washers to the bolts and nuts of a railway-rail joint they are placed on the bolts between the nuts and the adjacent fish-plate, with their lower square edges *c* bearing on the bases of the rails, or the plates sometimes arranged thereon, which afford sure rests for the washers and preclude turning of the same. The washers are of course placed in position before the nuts, and as the nuts are turned up on the bolts the resilient tongues *e* give and do not interfere with the turning of the nuts. When, however, the nuts are in their proper positions, with one of their sides parallel to the tongues *e*, the upper portions of said tongues will effectually prevent casual turning of the nuts toward the left. While this is so, it will be observed that if it is desired to tighten the nuts the spring-tongues *e* will permit of them being turned toward the right for such purpose. When the nuts are turned up on the bolts, as described, the right-hand end portions or wings *d*, bearing against the face of the fish-plate, will be bent back toward the vertical plane of the main portions *a*, because of the hollows under the washers, and consequently the washers will be placed under tension, with the result that they will operate to take up expansion of the bolts in warm weather and also to take up or compensate for wear of the bolts and other parts, and thereby keep the bolts at all times perfectly tight, which is an important desideratum. When it is desired to remove the nuts, the same can be accomplished by pressing or punching the resilient tongues e toward the rails sufficiently far to enable the nuts when turned toward the left to clear said tongues.

By reason of the construction of my improved washer it will be observed that it is necessary to press the tongue e but a slight distance inwardly in order to enable the nut when turned to the left to clear the same, and it will also be observed that while the washer bears at opposite points and throughout its height against the fish-plate, and hence is highly efficient in taking up expansion of the bolt and compensating for wear, it bears against only the right-hand portion of the inner side of the nut. By virtue of this and the employment of the straight tongue e the nut may be turned up on the bolt with but a minimum amount of effort. The tongue e is also advantageous, since its free end is not liable to catch against the surface against which the washer is arranged and interfere with the proper operation of said washer.

Having described my invention, what I claim, and desire to secure by Letters Patent, is—

In a nut-lock, the combination of a suitable device such as a fish-plate, a bolt extending through the same, a nut on the bolt, and the nut-locking washer described interposed between the nut and the device through which the bolt extends; the said washer being formed of a single piece of sheet metal, and consisting essentially of the main portion a curved outwardly at its lower left-hand corner, and having an aperture receiving the bolt, the straight, outwardly-extending, resilient tongue arranged at one edge of and joined to the outwardly-curved part of the portion a and separated from said portion a by a slit whereby said edge is enabled to bear throughout its height against the device through which the bolt extends, and the inwardly-inclined wing d arranged at the opposite edge of the portion a, with reference to the tongue e and extending throughout the height of the washer, and adapted to bear at its edge against the device through which the bolt is passed.

In testimony whereof I have hereunto set my hand in presence of two subscribing witnesses.

WILLIAM NICHOLSON KEEN.

Witnesses:
COLBERT FUSSELL,
D. T. KEEN.